(12) United States Patent
Rutschmann et al.

(10) Patent No.: US 8,648,487 B2
(45) Date of Patent: Feb. 11, 2014

(54) SHAFT POWER PLANT

(75) Inventors: Peter Rutschmann, Grünwald (DE); Albert Sepp, Riegsee/Hagen (DE)

(73) Assignee: Technische Universität München, Munich (DE)

(*) Notice: Subject to any disclaimer, the term of this patent is extended or adjusted under 35 U.S.C. 154(b) by 60 days.

(21) Appl. No.: 13/508,910

(22) PCT Filed: Oct. 19, 2010

(86) PCT No.: PCT/EP2010/006391
§ 371 (c)(1),
(2), (4) Date: Jun. 5, 2012

(87) PCT Pub. No.: WO2011/054447
PCT Pub. Date: May 12, 2011

(65) Prior Publication Data
US 2012/0235416 A1  Sep. 20, 2012

(30) Foreign Application Priority Data

Nov. 9, 2009  (DE) .................. 10 2009 052 383

(51) Int. Cl.
*F03B 13/00* (2006.01)
*H02P 9/04* (2006.01)
*E02B 9/00* (2006.01)

(52) U.S. Cl.
USPC ............................ 290/54; 405/78

(58) Field of Classification Search
USPC ............................ 290/54; 405/78
See application file for complete search history.

(56) References Cited

U.S. PATENT DOCUMENTS 1,436,933 A * 11/1922 Banki .................... 415/53.1
1,901,773 A *  3/1933 Pfau ......................... 415/17
3,927,534 A   12/1975 Larson et al. ............ 405/127
(Continued)

FOREIGN PATENT DOCUMENTS

CA  2224746 A1  8/1999
CN  101289843 A  10/2008
(Continued)

OTHER PUBLICATIONS

Aug. 25, 2011, International Search Report from European Patent Office, in PCT/EP2010/006391, which is another application of applicant Technische Universitat Munchen.
(Continued)

*Primary Examiner* — Pedro J Cuevas
(74) *Attorney, Agent, or Firm* — Kolisch Hartwell, PC

(57) ABSTRACT

A shaft power plant for energy conversion of a discharge between a headwater and a tailwater, comprising a vertical shaft, the top of which forms an inflow plane which is parallel to the bed and extends below the headwater water level, wherein the shaft is open toward the top and is closed by a base at its bottom end, a unit composed of a turbine and an electrical machine, wherein the unit is arranged entirely under water in the shaft and wherein the turbine is arranged for water to pass through horizontally, and an outflow, which is connected to the turbine, represents a closed flow channel and leads through a through-passage in the shaft to the tailwater, wherein a horizontal first cross-sectional area of the shaft is much larger than a vertical second cross-sectional area taken up by the turbine runner.

20 Claims, 7 Drawing Sheets

(56) References Cited

U.S. PATENT DOCUMENTS

| | | | | |
|---|---|---|---|---|
| 4,014,173 A * | 3/1977 | Keeling | | 405/78 |
| 4,073,146 A * | 2/1978 | Atencio | | 405/78 |
| 4,078,388 A * | 3/1978 | Atencio | | 405/78 |
| 4,132,901 A | 1/1979 | Crausbay | | 290/53 |
| 4,143,990 A * | 3/1979 | Atencio | | 405/78 |
| 4,159,188 A * | 6/1979 | Atencio | | 405/78 |
| 4,165,467 A * | 8/1979 | Atencio | | 290/52 |
| 4,170,428 A * | 10/1979 | Atencio | | 405/78 |
| 4,207,015 A * | 6/1980 | Atencio | | 405/78 |
| 4,222,877 A | 9/1980 | Silva | | 210/411 |
| 4,261,171 A * | 4/1981 | Atencio | | 60/398 |
| 4,275,989 A * | 6/1981 | Gutierrez Atencio | | 415/129 |
| 4,319,142 A * | 3/1982 | Mayo, Jr. | | 290/53 |
| 4,341,490 A * | 7/1982 | Keeling | | 405/36 |
| 4,345,159 A * | 8/1982 | Gutierrez Atencio | | 290/43 |
| 4,363,564 A | 12/1982 | Borgren | | 405/77 |
| 4,476,396 A * | 10/1984 | Calvert, Jr. | | 290/53 |
| 4,573,827 A * | 3/1986 | Mayo, Jr. | | 405/78 |
| 4,674,279 A * | 6/1987 | Ali et al. | | 60/398 |
| 4,691,115 A | 9/1987 | Robinson | | 290/1 R |
| 4,755,690 A * | 7/1988 | Obermeyer | | 290/52 |
| 4,794,544 A * | 12/1988 | Albright et al. | | 700/287 |
| 4,804,855 A * | 2/1989 | Obermeyer | | 290/54 |
| 4,941,771 A | 7/1990 | Perper | | 405/78 |
| 4,998,846 A * | 3/1991 | Evstratov et al. | | 405/78 |
| 5,322,412 A * | 6/1994 | Erlach | | 415/1 |
| 5,436,507 A * | 7/1995 | Brown et al. | | 290/52 |
| 5,754,446 A * | 5/1998 | Fisher et al. | | 700/287 |
| 5,800,077 A * | 9/1998 | March | | 405/80 |
| 5,864,183 A * | 1/1999 | Fisher et al. | | 290/43 |
| 5,905,311 A * | 5/1999 | Hess et al. | | 290/52 |
| 5,953,227 A * | 9/1999 | March et al. | | 700/36 |
| 6,038,494 A * | 3/2000 | Fisher et al. | | 700/287 |
| 6,114,773 A * | 9/2000 | Kouris | | 290/52 |
| 6,152,684 A * | 11/2000 | Ferme et al. | | 415/1 |
| 6,269,287 B1 * | 7/2001 | March | | 700/287 |
| 6,281,597 B1 | 8/2001 | Obermeyer et al. | | 290/54 |
| 6,357,389 B1 * | 3/2002 | March et al. | | 119/219 |
| 6,396,162 B1 | 5/2002 | Carrillo | | 290/43 |
| 6,490,506 B1 * | 12/2002 | March | | 700/286 |
| 6,841,893 B2 * | 1/2005 | Maiwald et al. | | 290/43 |
| 6,864,596 B2 * | 3/2005 | Maiwald et al. | | 290/43 |
| 7,061,135 B2 * | 6/2006 | Rammler et al. | | 290/54 |
| 7,084,521 B1 | 8/2006 | Martin | | 290/54 |
| 7,284,948 B2 * | 10/2007 | Nichtawitz | | 415/1 |
| 7,372,172 B2 * | 5/2008 | Winkler et al. | | 290/43 |
| 7,478,974 B1 * | 1/2009 | Kelly | | 405/78 |
| 7,503,744 B1 * | 3/2009 | Broome | | 415/3.1 |
| 7,658,589 B2 * | 2/2010 | Nichtawitz | | 415/3.1 |
| 7,785,037 B2 * | 8/2010 | Lederer et al. | | 405/78 |
| 8,262,315 B2 * | 9/2012 | Obermeyer | | 405/78 |
| 8,426,990 B2 * | 4/2013 | Oswald et al. | | 290/43 |
| 2004/0066043 A1 * | 4/2004 | Maiwald et al. | | 290/43 |
| 2004/0220701 A1 * | 11/2004 | Maiwald et al. | | 700/287 |
| 2009/0175723 A1 * | 7/2009 | Broome | | 416/31 |
| 2010/0269929 A1 | 10/2010 | Dodds | | 137/544 |
| 2012/0201672 A1 * | 8/2012 | Sepp et al. | | 415/221 |
| 2013/0140825 A1 * | 6/2013 | Holstein et al. | | 290/54 |

FOREIGN PATENT DOCUMENTS

| | | | | |
|---|---|---|---|---|
| DE | 19544141 A1 | 5/1997 | | |
| DE | 10322941 A1 | 12/2004 | | |
| DE | 102004035400 A1 | 2/2006 | | |
| DE | 102009037196 B3 * | 10/2010 | | E02B 9/00 |
| FR | 1045885 A | 12/1953 | | |
| FR | 1165735 A | 10/1958 | | |
| FR | 1165736 A | 10/1958 | | |
| FR | 1180856 A | 6/1959 | | |
| FR | 69884 A | 9/1959 | | |
| JP | 58183869 A | 10/1983 | | |
| JP | 60047882 A | 3/1985 | | |
| JP | 62035079 A | 2/1987 | | |
| JP | 6066242 A | 3/1994 | | |
| JP | 9137437 A | 5/1997 | | |
| RU | 2157870 C2 | 10/2000 | | |

OTHER PUBLICATIONS

D. Scott Riegert, "Reassessing Ranney Wells The ins and outs of horizontal collector", 2 page article in Public Works Magazine from the website http://www.pwmag.com, Apr. 15, 2006.

Ask Geoman, "Why do rivers become wider and deeper downstream?", 1 page article from the website at http://wwwjersey.uoregon.edu/~mstrick/AskGeoMan/geoQuerry62.html.

City of St. Helens, Oregon, "What is a Ranney Collector Well", 2 page article from the website http://www.ci.st-helens.or.us/Departments/WFF/Ranney.

The EARTHDR!, "Introduction to Basic Ground-Water Flow", 3 page article from the website http://www._earthdrz.org/influentand-deffluenstreams.htmi.

Sep. 1, 2011, International Search Report and Written Notice of International Search Authority from European Patent Office, in PCT/EP2010/004184, which is another application of applicant Technische Universität München.

Feb. 12, 2012 Written Opinion of the International Searching Authority from European Patent Office, in PCT/EP20101004184, which is another application of applicant Technische Universität München (with a WIPO English translation of same).

Feb. 14, 2012 International Preliminary Report on Patentability from European Patent Office, in PCT/EP2010/004184, which is another application of applicant Technische Universität München (with a WIPO English translation of same).

May 9, 2012 Written Opinion of the International Searching Authority from European Patent Office, in PCT/EP2010/006391, which is the international application to this U.S. application (with a WIPO English translation of same).

May 15, 2012 International Preliminary Report on Patentability from European Patent Office, in PCT/EP2010/006391, which is the international application to this U.S. application (with a WIPO English translation of same).

* cited by examiner

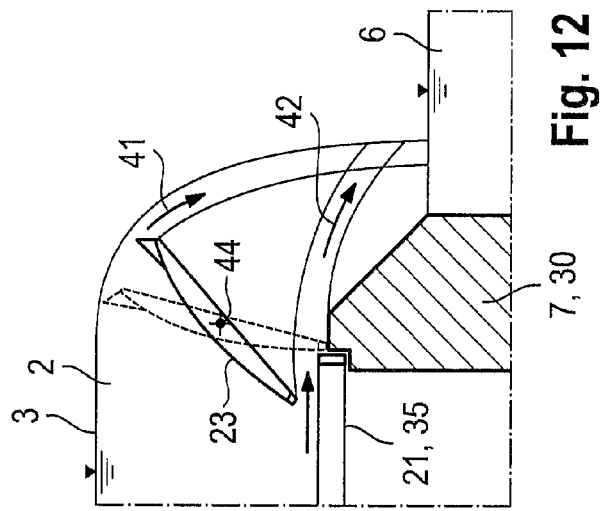
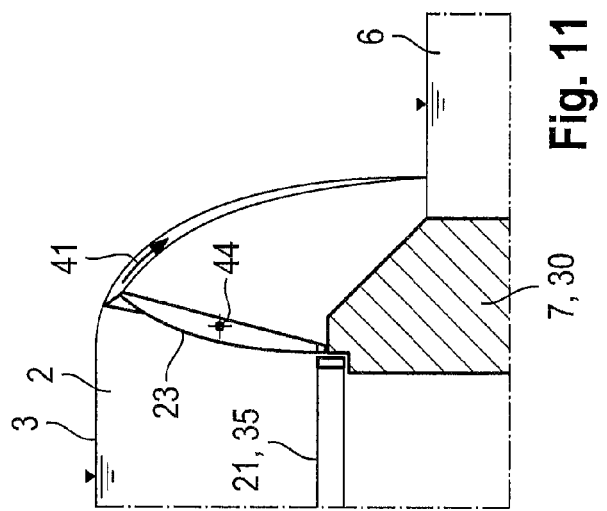
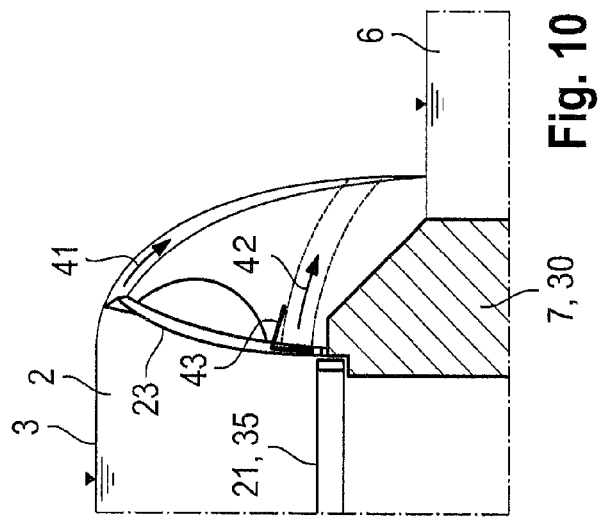

SHAFT POWER PLANT

CROSS-REFERENCE TO RELATED APPLICATION

This application is a national phase application of PCT/EP2010/006391, filed Oct. 19, 2010, which claims priority to German Patent Application No. 102009052383.9, filed Nov. 9, 2009, each of which is hereby incorporated by reference.

BACKGROUND AND SUMMARY

The invention relates to a shaft power plant and also to a shaft power plant module for generating electricity by energy conversion of a discharge between a headwater and a tailwater. To this end, the invention discloses a much simpler inflow concept for hydropower plants on damming structures, wherein all the important hydro-engineering requirements with regard to hydraulics, silt accretions, bed-load discharge, high water capability and also the necessary ecological components are taken into account.

On account of necessary climate protection, the continually increasing prices in the energy sector and further environmental effects, there are for the first time serious political commitments to sustainable energy concepts in Germany and also around the world. As a result of the positive development in the expansion of renewable energies, the German Federal Ministry for the Environment (Bundesministerium für Umwelt—BMU), in its 2007 progress report on the Renewable Energy Act (Erneuerbare-Energien-Gesetz—EEG), set a new expansion target of at least 27% electricity provision from renewable sources by the year 2020 and at least 45% by the year 2030. However, the BMU report also criticized the fact that the expansion of hydropower had hitherto remained far behind expectations. Causes for the stagnation in the expansion of hydropower in Germany were both the lack of economic incentives and also the high ecological requirements involving protracted and expensive authorization procedures. In addition, there was and is the risk of having to accept an application rejection, since evaluations are frequently made with nature conservation predominant and without objective assessment.

The fact that the BMU desires a further increase at all in electricity generation by hydropower, which is criticized by environmental organizations, can probably also be due to the fact that this manner of producing electricity is back in high regard on account of many environmentally relevant properties—high energy returned on energy invested, external $CO_2$ costs, constant availability, relatively favorable production costs—and this has also been rewarded since January 2009 with increased rates of remuneration.

In Germany, a further expansion of hydropower is regulated by the provisions in the BMU's Guideline for the remuneration of electricity from hydropower and also by the exist in principle only for locations having existing transverse structures and simultaneous ecological improvement.

In reinforced-bed fluvial topographies, the basic water level must be protected, and so a local gradient jump must be retained even from ecological and economic points of view—ramp structures are expensive, are hydraulically inefficient for high water discharge and have a poor $CO_2$ balance. The poor $CO_2$ balance of ramp structures results from the quarrying and truck transportation of very large quantities of hard rock. This provides essential preconditions for hydropower utilization. When an ability to pass through is provided at the same time, the provisions according to the EEG guideline of the BMU must also be met. The construction of relatively large or large plants in Germany continues to be restricted thereby or is made more difficult or prevented.

On account of the established boundary conditions (EEG remuneration, defined requirements), the interest in new hydropower plants has increased considerably, in spite of site conditions that are not ideal. However, practice has frequently shown that economic efficiency can scarcely be ensured with conventional power plant technology, in spite of better remuneration, in particular with a decreasing drop height, and it could even be possible for stagnation to occur again. However, if there is a desire to generate more electricity from hydropower, even with less favorable conditions, because of its convincing environmentally positive properties, new technical components having an ecological orientation are required for more efficient use.

The benefit of promoting new, practical developments in this sector is additionally enhanced because more efficient hydropower concepts can be installed around the world.

Small-scale hydropower provides particular advantages for emerging and developing nations because, for example, with small drop heights only simple structural requirements are set for the damming structure, no reservoir banks are necessary and only marginal changes have to be made to the watercourse. Since, as a rule, the generation of electricity from run-of-the-river hydropower plants is largely ensured at least with partial load and occurs in a highly predictable manner, an important demand for supply reliability can be fulfilled even in decentralized settlement structures in isolated operation.

The technology for generating electricity from hydropower is in principle fully developed for larger plants, as is clearly documented by the extremely high overall efficiency of up to 90%. Even in partial load operation, excellent conversion into electrical energy can take place in virtually all types of turbine.

On account of the demand for renewable sources of electricity, in the last few years, more intensive research has been carried out in the field of small-scale and very small-scale hydropower. In addition to increases in efficiency and technological improvements in water wheels, a number of new types of turbine have been developed, these new types of turbine taking account to some extent of the issues of downstream fish migration and the passage of fish. Particularly noteworthy are in this case the technologies of matrix turbines and hydropower screws. Both types have in the meantime achieved a certain market maturity.

In summary, it can be established that improved types of turbine have been developed in niche segments. However, for the sites of interest having the defined boundary conditions according to the BMU guideline, it is not the type of turbine that is decisive but the efficiency of the entire plant concept, in which the particular hydraulic-engineering conditions of fixed, usually silted-up weir systems should be taken into account. An essential demand consists additionally in the ability that is to be created to pass through upstream and downstream, wherein harm to fish caused by turbines should be avoided.

Hydropower utilization for the relevant sites in Germany usually takes place in the conventional form of a bay-type power plant having high structural outlay and to some extent considerable encroachment in the banks. If no increases in the water level are allowed to be carried out, extremely unfavorable preconditions occur for the incident flow of the power plant on account of the low flow depths, and these preconditions can be circumvented to a limited extent only by deepening the inflows, which is associated with technical, operational and also economic disadvantages.

Since a virtually vertical screen plane arranged at a low level is specified, even in the case of bed-load discharge, extensive deepening of the bed has to be carried out in order that minimum hydraulic requirements for the flow conditions can be ensured. For this purpose, upstream basins for bed-load deposition and flushing sluices for bed-load transmission should be arranged in the upper inward flow region. The inflow structure must be designed and dimensioned such that the natural, wide flow cross section is diverted with as little loss as possible into the compact bay cross section. Operational analyses that have been carried out show that in operational bay-type power plants approximately ⅔ of the costs have to be estimated for the structural proportion.

Disadvantages of previously known bay-type power plants in overview: extensive flow diversion, extensive encroachment in the banks, extensive deepening of the bed, which has to be protected by a bed-load sluice, noise pollution, to some extent negative visual effect on account of power plant buildings and ecological impairment of the previous stretch of river between inlet and outlet with downstream fish migration which is difficult to achieve.

It is the object of the invention to provide a hydropower plant which can be operated in an environmentally sound and efficient manner while being cost-effective to produce.

The object is achieved by the features of the independent claims. Advantageous developments are the subject matter of the dependent claims.

In order to be able to achieve increases in efficiency, a fundamental change in the plant design is necessary. The invention set out in the following text involves essentially a change from the vertical inflow plane to the horizontal inflow plane by means of a vertical shaft, from which considerable hydraulic, ecological and economic advantages can be derived. The invention involves an underwater hydropower concept, preferably at damming structures. In this case, damming structures should be understood as meaning in particular river barriers, dams, check dams, dam walls, weir systems, historic and also landmarked weir systems, transverse structures, locks, plants regulated by dams and/or the damming of flowing or standing waters. Furthermore, the expression damming structure relates here to a natural barrier between a headwater and a tailwater. All important hydraulic-engineering requirements with regard to hydraulics, silt accretions, bed-load discharge, high water capability and also the necessary ecological components are taken into account according to the invention.

Thus, the invention is achieved by a shaft power plant for generating electricity by energy conversion of a discharge between a headwater and a tailwater, comprising a vertical shaft, the top of which forms an inflow plane which is parallel to the bed and extends below the water level of the headwater, wherein the shaft is open toward the top and is closed by a base at its bottom end, a unit composed of a turbine and an electrical machine, wherein the unit is arranged entirely under water in the shaft and wherein the turbine is arranged for water to pass through horizontally, and an outflow, which is connected to the turbine, represents a closed flow channel and leads through a through-passage in the shaft to the tailwater, wherein a horizontal first cross-sectional area of the shaft is much larger than a vertical second cross-sectional area taken up by the turbine runner.

Preferably, the entire unit is in contact with water on all sides so as to ensure sufficient cooling.

Preferably, the turbine can also be arranged in an oblique manner, i.e. the turbine axis is at any desired angle between the horizontal and the vertical. Preferably, a deviation of the angle of the turbine axis from the horizontal of up to +/−40°, in particular up to +/−25°, in particular up to +/−15°, is defined as an arrangement "for water to pass through horizontally". More preferably, a deviation of the angle of the turbine axis from the vertical of up to +/−40°, in particular up to +/−25°, in particular up to +/−15°, is defined as an arrangement "for water to pass through vertically".

The arrangement for water to pass through horizontally is suitable in particular for very low drop heights. In this case, it is perfectly possible for a water level of the tailwater to be at the same level as the headwater bed plane. Furthermore, overall depth can be saved in the case of small drop heights, thereby entailing considerable cost advantages.

Preferably, the first cross-sectional area is defined at the level of a turbine axis of the turbine or at the level of the shaft top. If the first cross-sectional area is located at the level of the turbine axis, it is measured with the unit composed of the turbine and the electrical machine being disregarded. If the first cross-sectional area is located at the level of the shaft top, it is measured with any screen arrangements being disregarded. In other words, the first cross-sectional area is, for example in the case of a rectangular shaft, the product of the two clear side lengths of the shaft, wherein, in the case of vertical shaft walls, the first cross-sectional area is identical at the turbine axis and at the shaft top. The second cross-sectional area corresponds to a flow cross section in the turbine channel and is specified for example by the product of half the diameter of the turbine runner squared and pi. In a preferred configuration, it is provided that the first cross-sectional area is at least 1.5 times, in particular 5 times, in particular 10 times, in particular 30 times larger than the second cross-sectional area.

The definition "inflow plane which is parallel to the bed" also includes an inflow plane which is inclined slightly, in particular up to +/−40°, in particular up to +/−20°, in particular up to +/−10°, in particular up to +/−5°, with respect to the bed plane. The bed plane can deviate from the horizontal in particular in check dams. In the case of torrents, the negative inclination in particular is recommended, in particular up to −40°. In the case of the negative inclination, the inflow plane is inclined in the direction of the tailwater.

The unit is characterized by a compact construction, preferably having a permanent magnet synchronous generator having a variable speed and/or a direct coupling between the turbine and the electrical machine and/or virtually maintenance-free underwater operation. As a result of these properties, there is no need for a power house building and only the electronics needs to be set up in a container or building away from the water. On account of the specific construction of the turbine which is flowed through horizontally, a fundamental change in the inflow plane and screen plane can be carried out.

The shaft power plant according to the invention enables more cost-effective hydropower utilization on flowing waters having transverse structures in order to generate different energy levels in the body of water. Typical examples of such sites of application are, inter alia, existing transverse structures and historic weirs. The concept can also be applied at other sites, for example at check dams or in medium pressure systems which are silted-up or at risk of silting up, and also in artificial lakes and reservoirs.

The potential of such sites is also present in Germany and can be implemented economically on account of the optical advantages and low construction costs. As a result of the simple arrangement, the robustness and low maintenance requirement, the relatively low construction outlay and the possibility of working in a modular manner with prefabricated elements, use outside Germany and Europe, around the world, in particular also in developing nations, is possible.

With the concept of the shaft inflow, on account of the horizontal arrangement, the frequently required quotient of $Q_{turbine}/A_{screen\ area}<0.5$ m/s can be achieved much more easily and cost-effectively, because the shaft cross section has to be increased only two-dimensionally and furthermore no areas of the banks are taken up. Previously known bay-type power plants often achieve only Q/A=1 m/s. Q is the discharge in the turbine in m$^3$/s. A denotes the shaft cross-sectional area in the screen plane. In order to protect fish, the shaft cross-sectional area in the screen plane has to be selected to be large enough for the fish to be able to perceive the barrier and to react and to be able to escape under their own power, and for their physical capabilities to escape not to be exceeded, in other words, in extreme cases, $Q_{turbine}/A_{screen\ area}<0.3$ m/s should be preferred.

It is further preferred for the shaft top, or inflow plane, to extend in the bottom half, in particular in the bottom third, of a water depth of the headwater.

Advantageously, the shaft is open over its entire top side, with the exception of any screens. It is also advantageous for all of the side walls of the shaft to extend vertically, so that the first cross-sectional area is constant over the entire shaft depth. As a result, any restriction in the incident flow is prevented and the shaft can be produced very simply. The expression "vertical" side walls also includes a slight inclination, in particular up to +/−30°, in particular up to +/−10°, in particular up to +/−5°, with respect to the shaft base. It is also preferred for the shaft to be configured with deflecting walls that extend in a flow-favorable manner.

In a preferred configuration, the turbine, in particular the turbine runner, is arranged below the bed plane of the headwater and/or is arranged in the bottom half, in particular in the bottom third, of the shaft. The turbine and the electrical machine are preferably arranged clearly below the shaft top. In high channel flows, bed-load can pass into the shaft, the bed-load is flushed over the shaft by the positioned flap, i.e. the height of the shaft with regard to the river bed and the position of the turbine wheel below the inflow edge that holds back the bed-load are important.

It is advantageous for the turbine axis (rotational axis) of the turbine runner and an armature axis of the electrical machine to be arranged coaxially with one another and horizontally. Furthermore, it is preferably provided that the outflow widens, in particular continuously, directly after the turbine. It is particularly preferred for the outflow to comprise, in the following order downstream of the turbine, a flaring cone and a suction pipe or a suction hose.

The suction pipe or suction hose are configured preferably as a diffuser for recovering the velocity energy.

Preferably, the base of the shaft is arranged below the bed plane of the headwater. The shaft thus extends as far as below the bed plane of the headwater.

Preferably, the outflow extends through a side wall of the shaft to the tailwater. The unit is preferably mounted directly on the shaft wall.

In a further advantageous configuration, the inflow into the shaft is provided with a horizontal screen plane, which corresponds to the horizontal inflow plane, or a vertical screen plane having in particular a horizontal cover over the shaft. Preferably, use is made of an upstream coarse screen and a downstream fine screen. The fine screen is configured preferably with a grating spacing of <20 mm. Preferably, both screens have rotatable screen bars and/or a mechanical cover, e.g. a rolling cover, and also a screen cleaning device under water.

Preferably, the shaft power plant comprises a damming structure between the headwater and the tailwater. In this case, damming structures should be understood as meaning in particular river barriers, dams, check dams, dam walls, weir systems, historic and also landmarked weir systems, transverse structures, locks, plants regulated by dams and/or the damming of flowing or standing waters. Furthermore, the expression damming structure relates here to a natural barrier between a headwater and a tailwater.

Preferably, a flap which is permanently overflowed is arranged in the damming structure, in particular over the entire inflow width. Preferably, the shaft is configured with a polygonal or semicircular cross section, wherein one longitudinal side butts directly against the damming structure. Further preferably, the flap can be pivoted about a horizontal axis to enlarge the overflow and simultaneously to open an underflow. As an alternative to the pivotable flap, a rotary flap is preferred, wherein the rotary flap comprises on its bottom edge an integrated closure which allows the underflow to be regulated depending on the overflow.

The headwater level is regulated up to the maximum normal discharge of the turbine by the vane position of the preferred guide apparatus and the speed of the turbine runner. On account of the compact structural form with forced vertical diversion of the works water, a pronounced eddy formation is produced at the transition from free flow discharge to pressurized discharge. As was shown by the experiment on the physical model, even a relatively small, wide flap overflow prevents rotary flow with eddy formation that draws in air.

By way of the flap arranged on the end side, four essential effects are achieved: Prevention of eddy formation in the inflow by permanent overflow with simultaneous oxygen regulation. In this case, it is possible to regulate both the introduction and the removal of oxygen in the case of oversaturation. Wide and direct surface outflow into the tailwater. Eels, which live close to the bottom and only swim downstream on a few days in the fall could be allowed to pass into the tailwater without being harmed by temporarily opening the integrated cleaning closure, which is flush with the bed, or, if a pivoting flap is installed, by rotating the latter. Removal of driftwood and floating debris via the flap and removal of the screening material under the flap. And also, if appropriate, control of the headwater level.

On account of the permanent overflow of the flap, laminar flow close to the surface develops in the entire inflow region, as a result of which fish which particularly wish to migrate, in particular young fish that live predominantly at the surface, can descend without being harmed.

In order to meet the preferred requirements, a rotary flap must be equipped with a low, integrated closure. The alternative pivoting flap has a centrally arranged pivot pin, as a result of which a rotational movement in the clockwise direction simultaneously ensures or increases the under- or overflow. In order to be able to open the entire surface cross section in high channel flows and not to cause the risk of a log jam, use is preferably made of technology which allows the central pivot pin to be uncoupled and a pin at the bottom of the flap to be inserted.

Preferably, a bottom edge of the flap is arranged at the level of the shaft top.

Alternatively, it is advantageous for a flushing channel, which is located lower than the shaft top and lower than the bed plane of the headwater, to extend around the shaft, wherein the flushing channel leads to the flap and the bottom edge of the flap is arranged at the level of the flushing channel. The flap is preferably provided with a regulating device which is suitable for producing a bed-load discharging flushing surge.

Bed-load discharge takes place in the case of larger channel flows, wherein complete silting up can occur very frequently up to the shaft top in fixed weir systems. On account of the relatively small coverage, the flap flushing system according to the invention is effective. In conventional plants, complicated and extensive flushing structures are required on account of the subterranean development. By way of fine screening, the introduction of coarse bed-load is prevented, sands cause virtually no damage to the turbine in the low-pressure range.

Bed-load discharge and driftwood transport usually take place in high channel flows. In order to avoid corresponding mechanical and structural damage, the screen bars can preferably be designed in a rotatable manner (use as closure plane) in order to prevent the introduction of bed-load and floating matter into the shaft. At the same time, in the case of higher channel flows, the flap closure is designed with the effect that a drawdown curve forms over the screen plane and sufficiently large entraining forces are generated thereby to keep the inflow region free of bed-load. The shaft and flap should be dimensioned for the required full-area flushing action.

In conventional inflows, fish migrating downstream can be pushed against the inflow screen at high flow rates or get into the turbines of hydropower plants, as a result of which they risk being harmed. With the technical corrective measures carried out hitherto, it was possible to achieve at best partial successes. Thus, bypass systems for downstream fish migration are often without effect and constructive turbine solutions (runner geometry, speed) are associated with considerable losses of efficiency, with the question of the actual reduction in harm remaining open. According to the invention, a considerable reduction in harm to the fish stock is possible on account of the creation of safe migration corridors into the tailwater and the lowering of the incident flow speeds in the screen plane to preferably $v_m < 0.5$ m/s. In order to meet just the requirements for low incident flow speeds, in conventional power plant inflows having a vertical plane, the structures would have to be considerably increased in size, since hitherto dimensioning was carried out with $v_{m\ screen} \leq 1.0$ m/s.

With the concept of the shaft inflow according to the invention, on account of the horizontal arrangement, the required large screen surface can be produced with moderate flow rates without expensive ramp structures. The second requirement for functional migration corridors remains largely unmet in conventional power plants. With the shaft concept according to the invention, on account of the flap arrangement having the hydraulically necessary permanent overflow, there is the possibility, by preferably triangular or semicircular indentation in the top region of the flap, of reinforcing the direct outflow such that it is used by fish which wish to migrate. Eels, which live close to the bottom and only swim downstream on a few days in the fall, could be allowed to pass into the tailwater without being harmed by temporarily opening the integrated cleaning closure, which is flush with the bed, on the bottom edge of the flap. The proposed downstream fish migration techniques are promising because, in addition to the low flow rates in the fine screen plane, there is a short and direct path to the wide flap overflow or underflow. Preference is given to both continuous and (sensor) controlled operation, in which particular consideration could be given to the time periods for downstream fish migration.

On account of the preferred direct positioning of the shaft according to the invention at the weir body or damming structure, and also the fully underwater arrangement, further positive effects are achieved: completely invisible power plant buildings, retention of the waterway in the river bed without serious flow diversions and impairment of the ecological fauna and ecological flora, no formation of dead zones in the tailwater, and avoidance of noise pollution on account of the fully underwater arrangement.

Also preferred are adjustable screen bars as a closure device and/or other motorized covers and/or underwater screen cleaners and/or an integrated closure part, necessary for the transmission of the screening material, on the bottom edge of the flap.

As an alternative to the recessed arrangement of the shaft in the bed, it is preferably provided that the base of the shaft is arranged above the bed plane of the headwater. Preferably, to this end, the shaft is supported on the bed and/or fastened to the damming structure, in particular suspended, and/or arranged in a manner standing on a protrusion from the damming structure. Particularly preferably, the outflow comprises a cylindrical throughflow of constant cross section, in particular configured as a borehole, through the damming structure. The cylindrical section is adjoined preferably by a cross-sectional widening, in particular a diffuser, as the transition to the tailwater.

This variant is used preferably in medium pressure plants or in conventional dams. The shaft height on the damming structure is selected in a manner depending on the height of the dam and the silting scenario. The recovery of energy in the diffuser takes place preferably only on the air side.

As an alternative to the direct attachment of the shaft to the damming structure, the shaft is set up on the bank or bored directly into the rock or constructed in the rock. In this case, an existing diversion cut can be used in a modified manner as a connection to the tailwater. The shaft is configured preferably as a cylindrical borehole, in particular in the rock. In the case of stable rock, the walls of the borehole, that is to say the rock itself, forms the shaft wall directly. Alternatively, the shaft can be inserted into the borehole or be concreted in the borehole. Provision is furthermore advantageously made of an inward flow from the headwater into the shaft or into the borehole by means of a diversion. Two variants of a shaft in the rock are preferred. In the first variant, the lake contents (headwater) are turbined into the tailwater via a shaft in the rock. In the second variant, diversions are turbined into the lake. Diversions guide the water in the free flow discharge from a different valley into a pool. This means that there is always a difference in level between the arriving free flow discharge and the water level in the pool. This difference, which is reduced as the pool fills, can preferably be used energetically. In previously known methods, this difference is not used and the water runs over the rocks into the reservoir.

An overview of the advantages of the shaft power plant according to the invention: marginal flow diversion on account of the preferred modular construction and preferred multiple arrangement of a plurality of shaft power plants at a damming structure, turbines can be integrated in and on the weir without serious flow diversion, shaft inflow with a horizontal screen plane, little deepening of the bed by way of end-side flap flushing, no structural encroachments on the banks, no noise pollution, no generator cooling necessary, no visible power plant buildings, downstream fish migration possible via continuously charged flushing flap.

The invention furthermore comprises a shaft power plant module for generating electricity by energy conversion of a discharge between a headwater and a tailwater, comprising a vertical shaft module, the shaft top of which forms an inflow plane which is parallel to the bed and is configured to extend below the water level of the headwater, wherein the shaft module is open toward the top and is closed by a base at its bottom end, a unit module composed of a turbine and an electrical machine, wherein the unit module is configured to be arranged entirely under water in the shaft module and wherein the turbine is configured to be arranged for water to pass through horizontally, and an outflow module, which is connected to the turbine, represents a closed flow channel and is configured to lead through a through-passage in the shaft module to the tailwater, wherein a horizontal first cross-sectional area of the shaft module is much larger than a vertical second cross-sectional area taken up by the turbine runner.

The advantageous configurations, as have been discussed in connection with the shaft power plant according to the invention, are preferably applied in a corresponding manner to the shaft power plant module according to the invention. The separate shaft module, which can also be set up independently of a damming structure, comprises a shaft which is flowed through and has a vertical inflow plane, and a turbine having an electrical machine, these being arranged permanently under water. The shaft module can preferably be set up freely in a naturally or artificially dammed body of water or be built onto (hydraulic) structures having different functions. The shaft module integrates preferably a horizontal screen plane having a cleaning means. Eddies must be prevented by means of hydraulic measures. The modular construction allows the shaft power plant to be set up in a manner locally detached from (e.g. upstream of) a damming structure to be erected, an already existing dam or in an existing water pool. A hydraulic connection between the headwater and the tailwater must be ensured in each case.

The shaft power plant or shaft power plant module according to the invention comprises preferably a shaft having a simple cross section, in particular rectangular or circular or semicircular, having vertical or almost vertical walls. In any case, the usual flow-favorable constriction toward the turbine is preferably avoided and thus a cost-effective shaft geometry is selected. For flow diversion, simple guide elements or an optimized guide apparatus of the hydraulic machine can preferably be used. Guide elements formed in a flow-favorable manner, in particular guide elements that extend in a spiral shape are preferably arranged in the shaft. The cross section of the shaft is preferably much larger than that taken up by the turbine runner. In previously known equipment, the different cross sections are compensated by a complex, curved shell, in order to keep losses low. By contrast, in this case preferably a hydraulically unfavorable geometry is selected, with the unfavorable flow path being offset by a large cross-sectional area and possibly by guide elements and/or guide apparatus. The speeds are low on account of the large cross-sectional area and the hydraulic losses are correspondingly also low.

Preferably, in the proposed power plant, use is not made of an air space, a means of access or a lateral connection in the form of a conventional, accessible power plant control center. In previously known equipment, the turbines are set up in a dry, cohesive space, specifically alongside one another, i.e. one turbine per inflow. According to the invention, there is no such transverse connection.

BRIEF DESCRIPTION OF THE DRAWINGS

The invention is explained in more detail in the following text on the basis of exemplary embodiments, in which:

FIG. 10 shows a first variant of a flap for all three exemplary embodiments, and FIGS. 11 and 12 show a second variant of the flap for all three exemplary embodiments.

DETAILED DESCRIPTION

In the following text, three exemplary embodiments of a shaft power plant 1 according to the invention are explained in detail.

Figure 1:
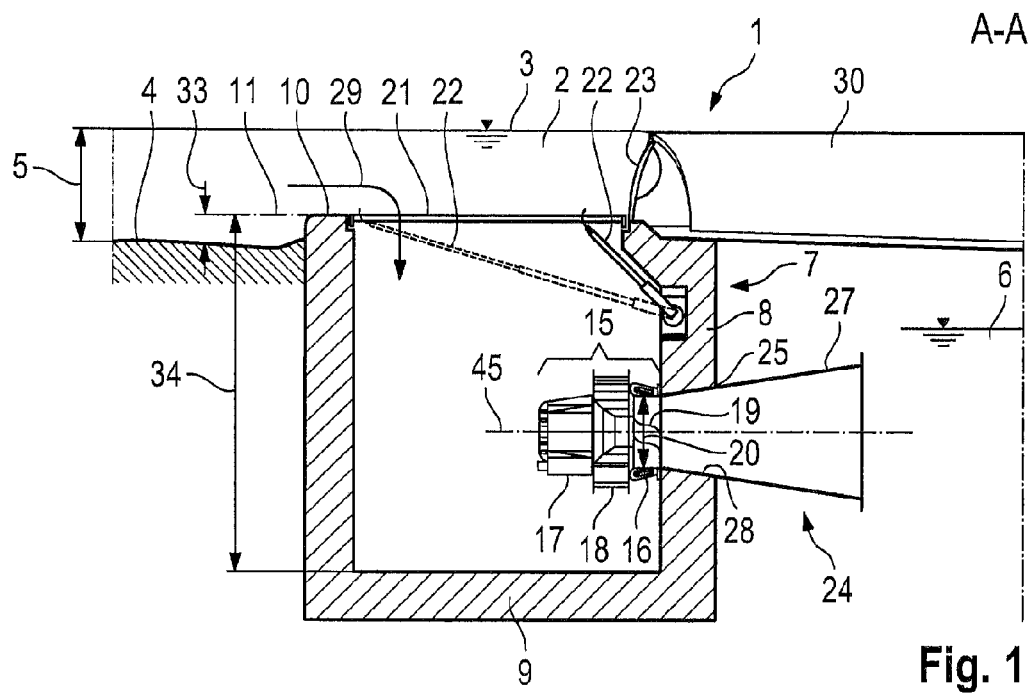
FIG. 1 shows a section through a shaft power plant according to the invention according to a first exemplary embodiment.
Figure 2:
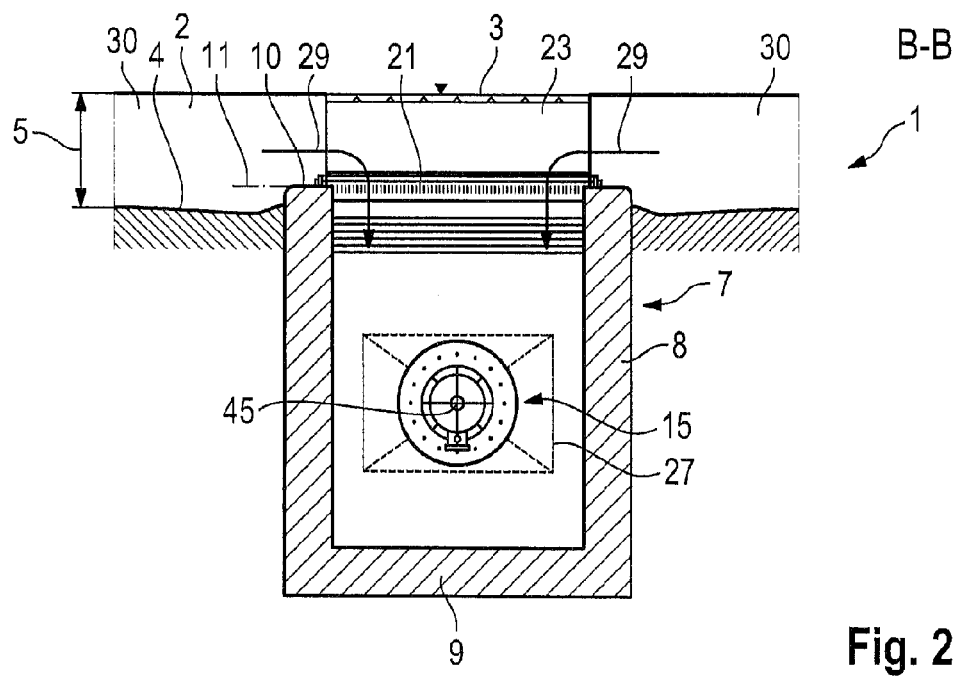
FIG. 2 shows a further section through the shaft power plant according to the invention according to the first exemplary embodiment.
Figure 3:
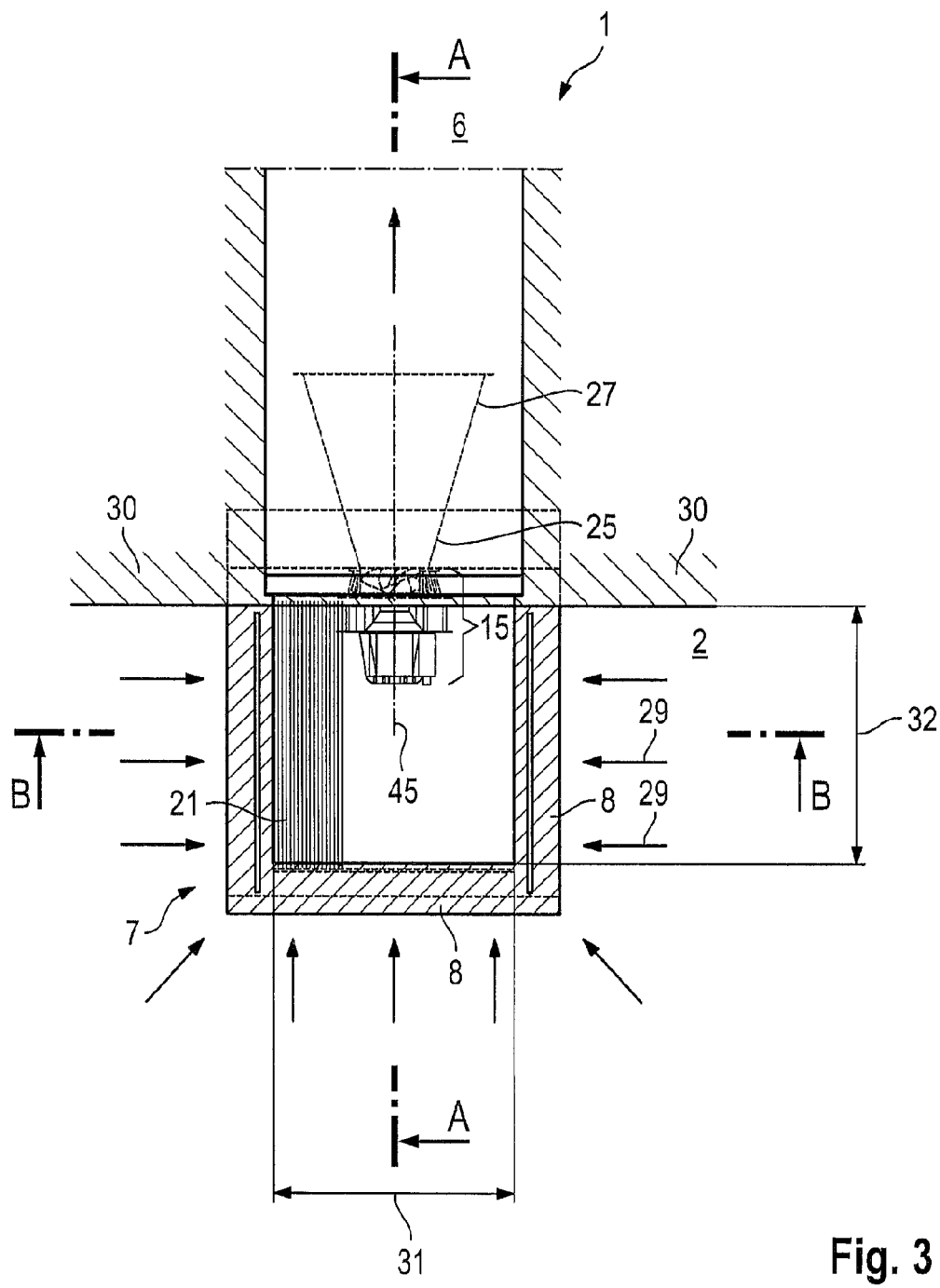
FIG. 3 shows a plan view of the shaft power plant according to the invention according to the first exemplary embodiment.

FIGS. 1 to 3 show the first exemplary embodiment of the shaft power plant 1. In this case, a headwater 2 having a headwater level 3 and a headwater bed plane 4 can be seen. Between the headwater level 3 and the headwater bed plane 4 there extends a headwater depth 5. Located somewhat lower than the headwater 2 is a tailwater 6. The shaft power plant 1 utilizes the drop height between the headwater 2 and the tailwater 6 to generate electrical energy.

To this end, the shaft power plant 1 comprises a vertical shaft 7 comprising vertical side walls 8 and a base 9. The base 9 of the vertical shaft 7 is arranged horizontally. The side walls 8 extend vertically upward from this base 9. The side walls 8 terminate level and flush with a shaft top edge or shaft top 10. This shaft top 10 defines a horizontal inflow plane 11 of the shaft 7. A clear shaft depth 34 is defined from this horizontal inflow plane 11 as far as the top edge of the base 9. The horizontal inflow plane 11 is located clearly below the headwater level 3 and is higher than the headwater bed plane 4 by a protrusion 33.

Located on the side wall 8 of the shaft 7 there is a horizontally arranged unit comprising a turbine 16 having a turbine axis 45, an electrical machine 17 in the form of a generator, and a guide apparatus 18. The turbine 16 is in this case connected firmly to the side wall 8. Located directly next to the turbine 16 is the guide apparatus 18 and located directly next to the guide apparatus 18 is the electrical machine 17. An essential component of the turbine 16 is a vertically arranged turbine runner 19 having a turbine runner diameter 20. A rotational axis (turbine axis 45) of the turbine runner 19 and also an armature axis of the electrical machine are coaxial with one another and horizontal.

The upwardly open side of the shaft 7 is provided with a horizontally arranged screen 21. This screen 21 is located in the horizontal inflow plane 11. Furthermore, in order to clean the screen 21, a screen cleaning means 22 is arranged within the shaft under water. Extending one side wall 8 of the shaft 7 there is a flap 23, which enables a connection between the headwater 2 and the tailwater 6, bypassing the shaft 7 and in particular bypassing the unit 15. The flap 23 is described in detail in FIGS. 10 to 12.

The unit 15 fastened to the side wall 8 is located directly at a circular through-passage 28 in the side wall 8. As a result, the unit 15 can be connected to the tailwater 6 via an outflow 24 forming a flow channel. To this end, the outflow 24 comprises a cone 25, which is adjoined by a suction pipe or suction hose 27. The cone 25 is inserted in the through-passage 28 and is connected in a sealed manner to an outlet from the turbine 16. Via this cone 25, the flow runs directly into the suction hose 27.

FIGS. 2 and 3 likewise show the first exemplary embodiment. Indicated in the plan view according to FIG. 3 is a section A, as is shown in FIG. 1, and a section B as per FIG. 2. It can be clearly seen in FIGS. 2 and 3 that one vertical side wall 8 of the shaft 7 directly adjoins a damming structure 30. FIG. 3 shows a horizontal cross-sectional area of the shaft 7 (first cross-sectional area), said cross-sectional area being defined by a first clear side length 31 and a second clear side length 32 of the shaft 7. The cross-sectional area of the shaft 7 is thus the product of the first side length 31 and the second side length 32. Apart from a small narrowing of the shaft 7 by a shoulder below a flap 23, the first cross-sectional area at the level of the shaft top 10 and at the level of the turbine axis 45 is identical here. A vertical cross-sectional area (second cross-sectional area) taken up by the turbine runner 19 is calculated from the turbine runner diameter 20 indicated in FIG. 1. The cross-sectional area taken up by the turbine runner 19 within the turbine 16 is thus the product of half the turbine runner diameter 20 squared and pi. What is decisive in the present invention is, then, that the cross-sectional area of the shaft 7 is much larger than the cross-sectional area taken up by the turbine runner 19. As a result, the flow rate of the water in the screen plane is very low and is accelerated only just before the turbine 16, as a result of which the loading of the shaft 7 with entrained and floating material is reduced and also fish can pass the shaft power plant 1 via the flap 23 without passing through the turbine passage.

The water flows into the shaft 7 from three sides via the horizontal inflow plane 11 in the inflow direction 29 indicated in FIGS. 1, 2 and 3. By way of the guide apparatus 18, the water is guided horizontally to the turbine runner 19. At the turbine outlet, the water flows via the cone 25 and leaves the shaft power plant 1 via the suction hose 27 and flows away into the tailwater 6. The rotational movement of the turbine runner 19 is converted into electric current via the electrical machine 17. In this case, the entire unit 15 is seated in the shaft 7 and thus entirely under water. Consequently, no further cooling of the unit 15 is necessary. The electric current generated is guided toward the outside by a cable connection which is not shown.

Figure 4:
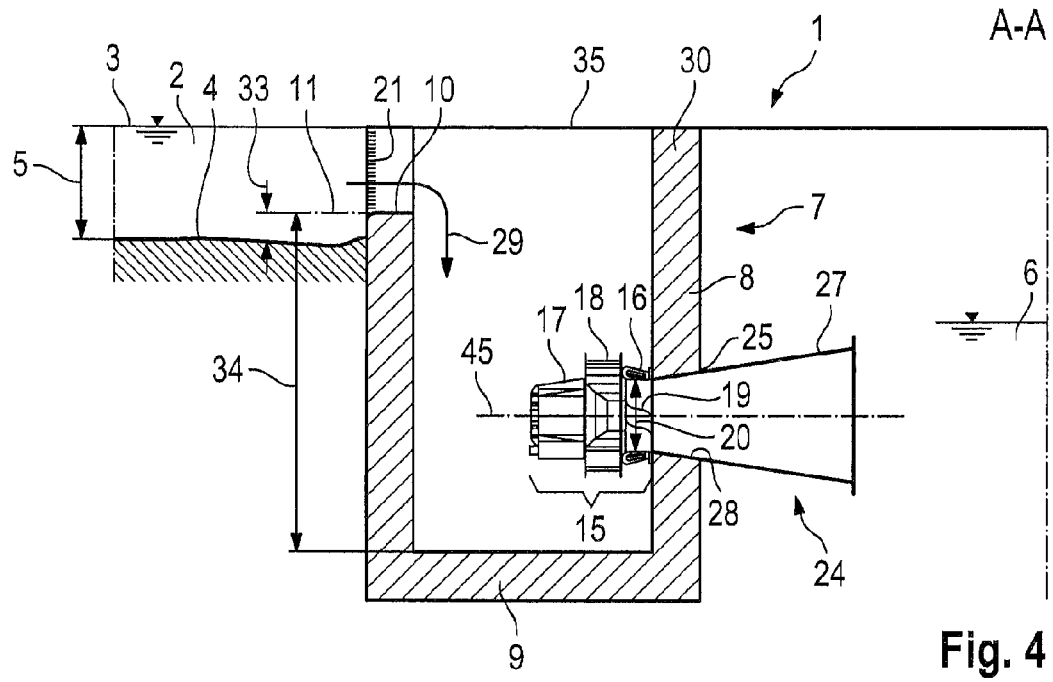
FIG. 4 shows a sectional view of the shaft power plant according to the invention according to a second exemplary embodiment.
Figure 5:
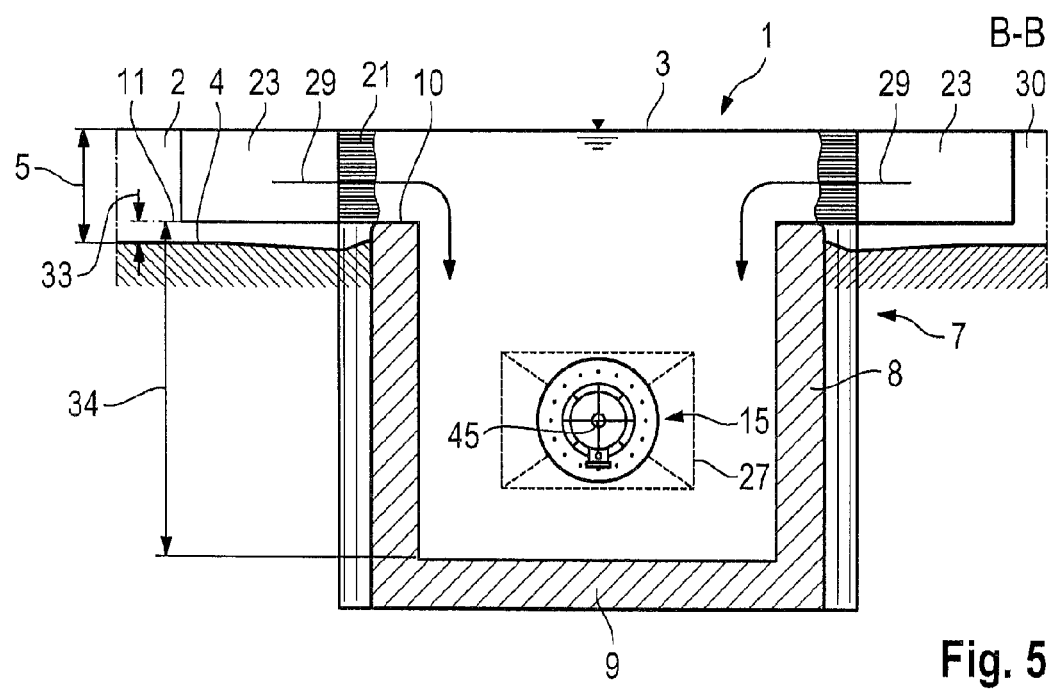
FIG. 5 shows a further sectional view of the shaft power plant according to the invention according to the second exemplary embodiment.
Figure 6:
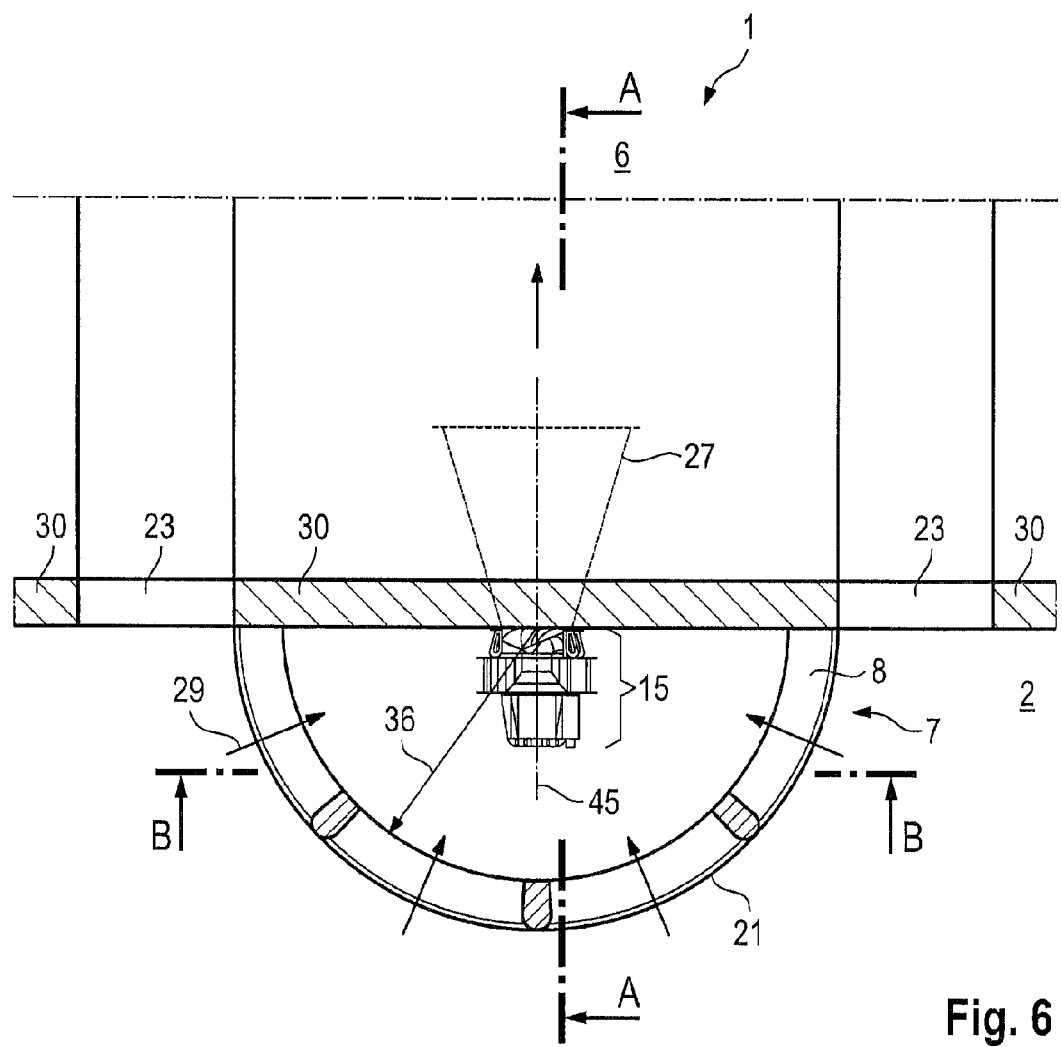
FIG. 6 shows a plan view of the shaft power plant according to the invention according to the second exemplary embodiment.

FIGS. 4, 5 and 6 show a second exemplary embodiment of the shaft power plant 1. Identical or functionally identical components are described with the same reference signs in the second exemplary embodiment as in the first exemplary embodiment.

In contrast to the first exemplary embodiment, the second exemplary embodiment shows a variant having a semicircular, vertical shaft 7 and also a vertically arranged screen 21.

It can be clearly seen in FIGS. 4 and 5 that in this case the screen 21 is provided vertically as an extension of the semicircular, vertical side wall 8 of the shaft 7. In this case, the screen 21 extends from the shaft top 10 as far at least as the headwater level 3. For safety reasons, the entire shaft 7 is covered with a cover 35 approximately at the level of the headwater level 3.

FIG. 6 shows the semicircular configuration of the vertical shaft 7, with the straight side of the semicircular shaft 7 being combined with the damming structure 30. This is shown in particular in FIG. 4, according to which the vertical side wall 8 merges integrally into the damming structure 30 exactly from the horizontal inflow plane 11. A cross-sectional area (first cross-sectional area) of the shaft 7 is defined by the radius 36. Thus, the cross-sectional area of the shaft 7 is calculated here from half the product of the radius 36 squared and pi.

In the second exemplary embodiment, two flaps 23 are provided to the side of the shaft 7. The bed-load carried along by the headwater 2 gets caught at the protrusion 34 and slides around the semicircle to the flaps 23. This prevents the turbine 16 from taking in too much bed-load.

Figure 7:
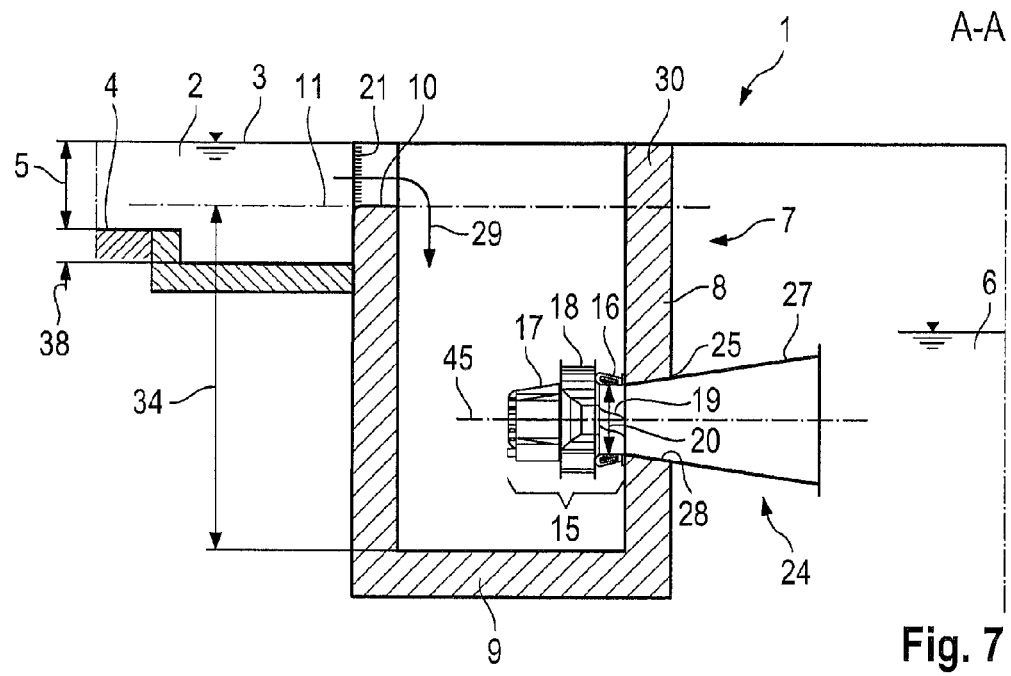
FIG. 7 shows a sectional view of the shaft power plant according to the invention according to a third exemplary embodiment.
Figure 8:
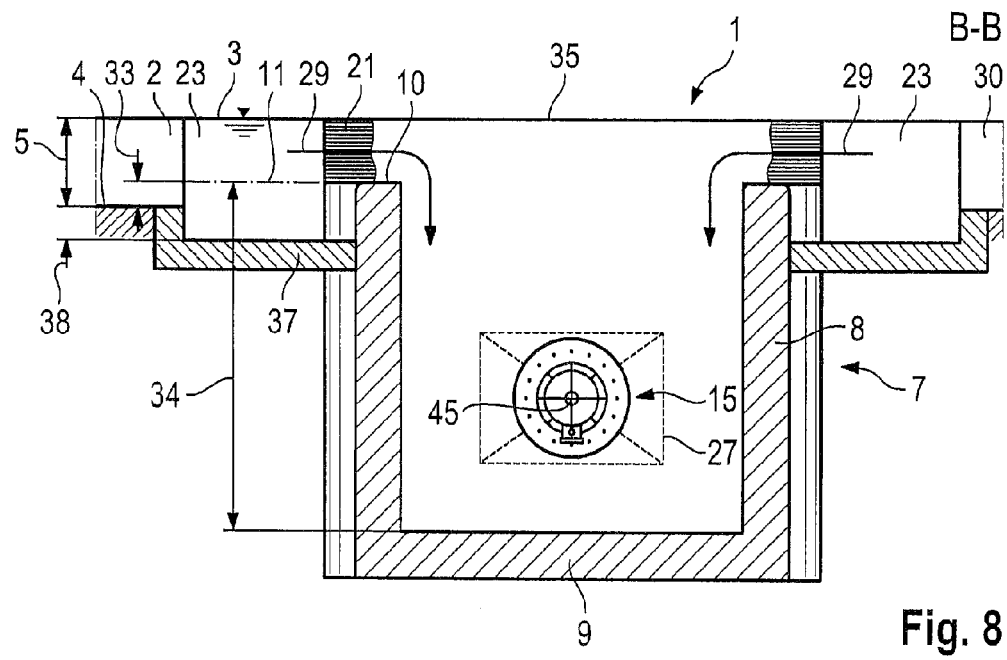
FIG. 8 shows a further sectional view of the shaft power plant according to the invention according to the third exemplary embodiment.
Figure 9:
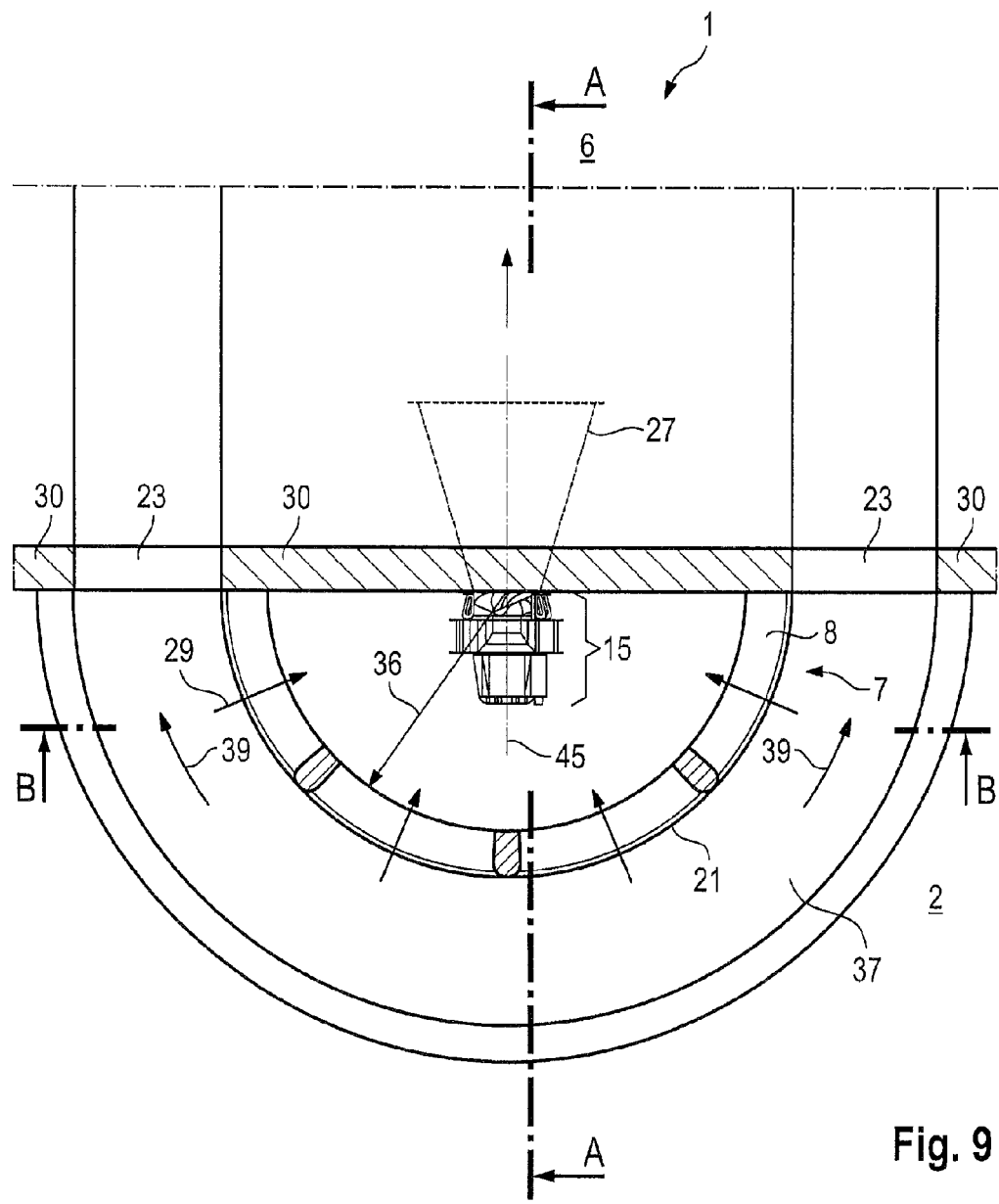
FIG. 9 shows a plan view of the shaft power plant according to the invention according to the third exemplary embodiment.

FIGS. 7 to 9 show a third exemplary embodiment of the shaft power plant. Identical or functionally identical components are designated by the same reference signs in the first, second and third exemplary embodiments.

The third exemplary embodiment is configured in the same way as the second exemplary embodiment with a semicircular, vertical shaft 7, two side flaps 23 and vertically standing screens 21 having horizontal bars.

As an additional feature, in the third exemplary embodiment a flushing channel 37 is formed around the entire semicircle outside the shaft 7 or outside the vertical shaft walls 8. This flushing channel 37 leads from one flap 23, around the shaft 7, to the other flap 23. In this case, the flushing channel 37 is located below the headwater bed plane 4 by a flushing channel depth 38. Thus, in the third exemplary embodiment it is no longer just the protrusion 33 that serves to collect the bed-load but also the flushing channel depth 38. When the flaps 23 on both sides of the shaft 7 are opened, a flushing flow 39 toward the two flaps 23 is produced in the flushing channel 37.

It should in particular be pointed out that the different properties of the three exemplary embodiments can be mixed. Thus, in each of the three exemplary embodiments, preference is given to both a horizontal and a vertical screen arrangement, a round or polygonal shaft geometry, one or more flaps 23 and/or a flushing channel 27.

In the following text, two different variants of the flap 23 are presented on the basis of FIGS. 10, 11 and 12. Either of the two flap variants can be applied advantageously to all three exemplary embodiments.

FIG. 10 shows a first variant of the flap 23. As was shown in the various exemplary embodiments, the flap 23 can be arranged either on a side wall 8 of the vertical shaft 7 or in the damming structure 30. In the closed state, as shown in FIG. 10, the flap 23 is offset downward slightly with respect to the headwater level 3, so that a permanent overflow 41 is produced. Furthermore, the flap 23 in the first variant is rotatable, so that the overflow 41 can be regulated.

In the lower region of the flap 23, it can be seen that a bottom edge of the flap 23 is located approximately at the level of the screen 21 or of the cover 35. In order to ensure an underflow 42 between the flap 23 and the shaft 7 or the damming structure 30, provision is made here of an integrated closure 43. This integrated closure 43 is a pivotable part in the bottom region of the flap 23. The overflow 41 and also the underflow 42 are direct hydraulic connections from the headwater 2 to the tailwater 6, bypassing the shaft 7 and also bypassing the electricity generating unit 15.

FIGS. 11 and 12 show a second variant of the flap 23. In FIG. 11, the flap 23 is shown in the closed state, wherein here, in turn, the top edge of the flap 23 is offset downward slightly with respect to the headwater level 3, so that a constant overflow 41 is produced. In this second variant, no integrated closure 43 is provided. Instead of this, the flap 23 is mounted here such that its middle can be pivoted about a horizontal pin 44. By pivoting the flap 23 out, the volume flow in the overflow 41 and in the underflow 42 is simultaneously increased.

On account of the constant overflow 41, eddy formation above the shaft 7 is avoided. Thus, flotsam can always be flushed on the surface of the water from the headwater 2 to the tailwater 6, bypassing the electricity generating unit 15. On account of the underflow 22, which is controlled in a time-based or need-based manner, bed-load which is carried along and has collected at the protrusion 33 or in the flushing channel 37 is removed directly from the headwater 2 into the tailwater 6, bypassing the electricity generating unit 15. In addition, the underflow 42 serves as an eel through-passage or serves for the downstream migration of fish that swim close to the surface.

According to the invention, in all of the exemplary embodiments, the flow always flows in from top to bottom through the shaft and leaves the shaft horizontally through the unit 15. The inlet plane to the shaft is always under water and a minimum coverage should be ensured in order that no eddies that draw in air occur. The exemplary embodiments are used preferably at silted-up transverse structures. These are characterized not only by a difference in water level (headwater/tailwater) but also by the fact that heavy bed-load transport takes place in the event of high water. Furthermore, high speeds occur here with a low flow depth and high discharges, it being necessary for said high speeds to be decelerated to less than 1 m/s in the screen plane upstream of the turbine. In conventional plants, this can take place only by deepening the approximately vertical inflow into the turbines. However, such arrangements are problematic in operation, since deposition of bed-load occurs in the inward flow into the turbines, resulting in losses of efficiency and operational disruptions. In contrast thereto, the invention proposed affords the possibility of increasing the shaft cross section as desired in a 2D horizontal plane and thus of lowering the speeds without problems to 0.5 m/s or less. The size of the shaft cross section thus becomes an additional manipulated variable which can be optimized without problems for example with regard to fish friendliness.

The concept proposed includes operationally friendly and durable solutions to the problems of bed-load. Further, high water can be discharged without problems. Preferably, the entire width of the course of the river is flowed over, i.e. as a result of the power plant construction, there is no loss of capacity and on account of the underwater arrangement, there is no water damage. Furthermore, use can be made of existing, even historic, weirs, which for economic and landmark preservation reasons should be modified as little as possible. In conventional bay-type power plants, the water has to be diverted out of the course of the river and returned thereto again. This causes large encroachments, high costs, operational difficulties and the powerhouse is visible and acoustically perceptible. The invention proposed changes the discharge path of the existing course of the river only a little.

Alternatively, the unit with the turbine can preferably also be arranged for water to pass through vertically (vertical arrangement of the unit). The invention is illustrated, taking account of both variants, the horizontal and the vertical arrangement of the unit, as follows:

a. A shaft power plant (1) for generating electricity by energy conversion of a discharge between a headwater (2) and a tailwater (6), comprising
a vertical shaft (7), the top (10) of which forms an inflow plane (11) which is parallel to the bed and extends below the water level (3) of the headwater, wherein the shaft (7) is open toward the top and is closed by a base (9) at its bottom end,
a unit (15) composed of a turbine (16) and an electrical machine (17), wherein the unit (15) is arranged entirely under water in the shaft (7) and wherein the turbine (16) is arranged for water to pass through vertically or horizontally, and
an outflow (24), which is connected to the turbine (16), represents a closed flow channel and leads through a through-passage (28) in the shaft (7) to the tailwater (6),
wherein, with the water passing through the turbine (16) vertically, in a horizontal plane of a turbine runner (19) of the turbine (16), a first cross-sectional area of the shaft (7) is much larger than a second cross-sectional area taken up by the turbine runner (19), or
with the water passing through the turbine (16) horizontally, a horizontal first cross-sectional area of the shaft (7) is much larger than a vertical second cross-sectional area taken up by the turbine runner (19).

b. The shaft power plant according to point a, characterized in that the first cross-sectional area is at least 1.5 times, in particular 5 times, in particular 10 times, in particular 30 times larger than the second cross-sectional area.

c. The shaft power plant according to one of the preceding points, characterized in that, in the horizontal arrangement of the unit (15), the first cross-sectional area is defined at the level of a turbine axis (45) or at the level of the shaft top (10).

d. The shaft power plant according to one of the preceding points, characterized in that the shaft top (10) is arranged in the bottom half, in particular in the bottom third, of a water depth (5) of the headwater.

e. The shaft power plant according to one of the preceding points, characterized in that the shaft (7) is open over its entire top side.

f. The shaft power plant according to one of the preceding points, characterized in that all of the side walls (8) of the shaft (7) extend vertically, so that the first cross-sectional area is constant over the entire shaft depth (34). The vertical shaft walls can preferably be designed in a flow-favorable manner and/or comprise flow-favorable guide elements. Alternatively preferred is a shaft form which leads from the rectangular inflow cross section having a flow-optimized wall, e.g. spiral shaped and/or having a circular cross section, to the turbine.

g. The shaft power plant according to one of the preceding points, characterized in that the turbine (16), in particular the turbine runner (19), is arranged below the bed plane (4) of the headwater and/or is arranged in the bottom half, in particular in the bottom third, of the shaft (7).

h. The shaft power plant according to one of the preceding points, characterized in that the turbine axis of the turbine runner (19) and an armature axis of the electrical machine (17) are arranged coaxially with one another and vertically or horizontally.

i. The shaft power plant according to one of the preceding points, characterized in that the outflow (24) widens, in particular continuously, directly after the turbine (16).

j. The shaft power plant according to one of the preceding points, characterized by a damming structure (30) between the headwater (2) and the tailwater (6).

k. The shaft power plant according to point j, characterized in that the shaft (7) is configured with a polygonal or semicircular cross section, wherein one longitudinal side of the shaft (7) butts directly against the damming structure (30).

l. The shaft power plant according to either of points j and k, characterized in that at least one flap (23) which is permanently overflowed is arranged in the damming structure (30).

m. The shaft power plant according to point l, characterized in that the flap (23) is configured to enlarge the overflow (41) and to open an underflow (42).

n. The shaft power plant according to either of points l and m, characterized in that an integrated closure (43) for regulating the underflow (42) is arranged on a bottom edge of the flap (23).

o. The shaft power plant according to one of the preceding points, characterized in that, in a vertical arrangement of the unit (15), the outflow (24) is curved, in particular through 90°.

p. The shaft power plant according to one of the preceding points, characterized in that the base (9) of the shaft (7) is arranged below the bed plane (4) of the headwater (2).

q. The shaft power plant according to one of the preceding points, characterized in that, in the vertical arrangement of the unit (15), the outflow (24) comprises, in the following order downstream of the turbine (16), a flaring cone (25), an elbow and a suction pipe or a suction hose (27), and in that, in the horizontal arrangement of the unit (15), the outflow (24) comprises, in the following order downstream of the turbine (16), a flaring cone (25) and a suction pipe or a suction hose (27).

r. The shaft power plant according to one of the preceding points, characterized in that, in the vertical arrangement of the unit (15), the outflow (24) is arranged above the turbine runner (19), so that during electricity generation the water flows through the turbine runner (19) from bottom to top.

s. The shaft power plant according to point r, characterized in that the outflow (24) extends through a side wall (8) of the shaft (7) to the tailwater (6).

t. The shaft power plant according to one of the preceding points, characterized in that, in the vertical arrangement of the unit (15), the outflow (24) is arranged under the turbine runner (19), so that during electricity generation the water flows through the turbine runner (19) from top to bottom.

u. The shaft power plant according to one of the preceding points, characterized in that, in the horizontal arrangement of the unit (15), the unit (15) is mounted directly on a side wall (8) of the shaft (7) and the outflow (24) extends through the side wall (8) to the tailwater (6).

v. The shaft power plant according to one of the preceding points, characterized in that, in the horizontal arrangement of the unit (15), the outflow (24) is arranged to the side of the turbine runner (19), so that during electricity generation the water flows horizontally through the turbine runner (19).

w. The shaft power plant according to point t, characterized in that, in the vertical arrangement of the unit (15), the outflow (24) extends through the base (9) of the shaft (7) to the tailwater (6).

x. The shaft power plant according to either of points t and w, characterized in that, in the vertical arrangement of the unit (15), the shaft (7) is configured to form a cavity underneath the base (9), wherein the base (9) of the shaft (7) forms a ceiling of the cavity and wherein the outflow (24) extends through the ceiling, the cavity and a side wall of the cavity as far as the tailwater (6).

y. The shaft power plant according to one of the preceding points, characterized in that an inflow (29) into the shaft (7) is provided with a horizontal screen plane (21), or a vertical screen plane (21), in particular with a horizontal cover (35) over the shaft (7).

z. The shaft power plant according to one of points p to y, characterized in that a flushing channel (37), which is located lower than the shaft top (10) and lower than the bed plane (4) of the headwater (2), extends around the shaft (7), wherein the flushing channel (37) leads to the flap (23) and the bottom edge of the flap (23) is arranged at the level of the flushing channel (37).

aa. The shaft power plant according to one of points a to o, characterized in that the base (9) of the shaft (7) is arranged above the bed plane (4) of the headwater (2).

bb. The shaft power plant according to point aa, characterized in that the outflow (24) comprises a cylindrical throughflow of constant cross section through the damming structure (30).

cc. A shaft power plant module for generating electricity by energy conversion of a discharge between a headwater (2) and a tailwater (6), comprising a vertical shaft module (7), the shaft top (10) of which forms an inflow plane (11) which is parallel to the bed and is configured to extend below the water level (3) of the headwater, wherein the shaft module (7) is open toward the top and is closed by a base (9) at its bottom end, a unit module (15) composed of a turbine (16) and an electrical machine (17), wherein the unit module (15) is configured to be arranged entirely under water in the shaft module (7) and wherein the turbine (16) is configured to be arranged for water to pass through vertically or horizontally, and an outflow module (24), which is connected to the turbine (16), represents a closed flow channel and is configured to lead through a through-passage (28) in the shaft module (7) to the tailwater (6), wherein, with the water passing through the turbine (16) vertically, in a horizontal plane of a turbine runner (19) of the turbine (16), a first cross-sectional area of the shaft module (7) is much larger than a second cross-sectional area taken up by the turbine runner (19), or with the water passing through the turbine (16) horizontally, a horizontal first cross-sectional area of the shaft (7) is much larger than a vertical second cross-sectional area taken up by the turbine runner (19).

The present disclosure may also include one or more of the following concepts:

aaa. A shaft power plant (1) for generating electricity by energy conversion of a discharge between a headwater (2) and a tailwater (6), comprising a vertical shaft (7), the top (10) of which forms an inflow plane (11) which is parallel to the bed and extends below the water level (3) of the headwater, wherein the shaft (7) is open toward the top and is closed by a base (9) at its bottom end, a unit (15) composed of a turbine (16) and an electrical machine (17), wherein the unit (15) is arranged entirely under water in the shaft (7) and wherein the turbine (16) is arranged for water to pass through horizontally, and an outflow (24), which is connected to the turbine (16), represents a closed flow channel and leads through a through-passage (28) in the shaft (7) to the tailwater (6), wherein a horizontal first cross-sectional area of the shaft (7) is much larger than a vertical second cross-sectional area taken up by the turbine runner (19).

bbb. The shaft power plant of Paragraph aaa, characterized in that the first cross-sectional area is at least 1.5 times, in particular 5 times, in particular 10 times, in particular 30 times larger than the second cross-sectional area.

ccc. The shaft power plant as in one of the preceding Paragraphs, characterized in that the first cross-sectional area is defined at the level of a turbine axis (45) or at the level of the shaft top (10).

ddd. The shaft power plant as in one of the preceding Paragraphs, characterized in that the shaft top (10) is arranged in the bottom half, in particular in the bottom third, of a water depth (5) of the headwater.

eee. The shaft power plant as in one of the preceding Paragraphs, characterized in that the shaft (7) is open over its entire top side.

fff. The shaft power plant as in one of the preceding Paragraphs, characterized in that all of the side walls (8) of the shaft (7) extend vertically, so that the first cross-sectional area is constant over the entire shaft depth (34).

ggg. The shaft power plant as in one of the preceding Paragraphs, characterized in that the turbine (16), in particular the turbine runner (19), is arranged below the bed plane (4) of the headwater and/or is arranged in the bottom half, in particular in the bottom third, of the shaft (7).

hhh. The shaft power plant as in one of the preceding Paragraphs, characterized in that the turbine axis (45) of the turbine runner (19) and an armature axis of the electrical machine (17) are arranged coaxially with one another and horizontally.

iii. The shaft power plant as in one of the preceding Paragraphs, characterized in that the outflow (24) widens, in particular continuously, directly after the turbine (16).

jjj. The shaft power plant as in one of the preceding Paragraphs, characterized by a damming structure (30) between the headwater (2) and the tailwater (6).

kkk. The shaft power plant of Paragraph jjj, characterized in that the shaft (7) is configured with a polygonal or semicircular cross section, wherein one longitudinal side of the shaft (7) butts directly against the damming structure (30).

lll. The shaft power plant as in either of Paragraphs jjj and kkk, characterized in that at least one flap (23) which is permanently overflowed is arranged in the damming structure (30).

mmm. The shaft power plant of Paragraph lll, characterized in that the flap (23) is configured to enlarge the overflow (41) and to open an underflow (42).

nnn. The shaft power plant as in either of Paragraphs lll and mmm, characterized in that an integrated closure (43) for regulating the underflow (42) is arranged on a bottom edge of the flap (23).

ooo. The shaft power plant as in one of the preceding Paragraphs, characterized in that the base (9) of the shaft (7) is arranged below the bed plane (4) of the headwater (2).

ppp. The shaft power plant as in one of the preceding Paragraphs, characterized in that the outflow (24) comprises, in the following order downstream of the turbine (16), a flaring cone (25) and a suction pipe or a suction hose (27).

qqq. The shaft power plant as in one of the preceding Paragraphs, characterized in that the unit (15) is mounted directly on a side wall (8) of the shaft (7) and the outflow (24) extends through the side wall (8) to the tailwater (6).

rrr. The shaft power plant as in one of the preceding Paragraphs, characterized in that the outflow (24) is arranged to the side of the turbine runner (19), so that during electricity generation the water flows horizontally through the turbine runner (19).

sss. The shaft power plant as in one of the preceding Paragraphs, characterized in that an inflow (29) into the shaft (7) is provided with a horizontal screen plane (21), or a vertical screen plane (21), in particular with a horizontal cover (35) over the shaft (7).

ttt. The shaft power plant as in one of Paragraphs ooo to sss, characterized in that a flushing channel (37), which is located lower than the shaft top (10) and lower than the bed plane (4) of the headwater (2), extends around the shaft (7), wherein the flushing channel (37) leads to the flap (23) and the bottom edge of the flap (23) is arranged at the level of the flushing channel (37).

uuu. The shaft power plant as in one of Paragraphs aaa to nnn, characterized in that the base (9) of the shaft (7) is arranged above the bed plane (4) of the headwater (2).

vvv. The shaft power plant of Paragraph uuu, characterized in that the outflow (24) comprises a cylindrical through-flow of constant cross section through the damming structure (30).

www. A shaft power plant module for generating electricity by energy conversion of a discharge between a headwater (2) and a tailwater (6), comprising
a vertical shaft module (7), the shaft top (10) of which forms an inflow plane (11) which is parallel to the bed and is configured to extend below the water level (3) of the headwater, wherein the shaft module (7) is open toward the top and is closed by a base (9) at its bottom end,
a unit module (15) composed of a turbine (16) and an electrical machine (17), wherein the unit module (15) is configured to be arranged entirely under water in the shaft module (7) and wherein the turbine (16) is configured to be arranged for water to pass through horizontally, and
an outflow module (24), which is connected to the turbine (16), represents a closed flow channel and is configured to lead through a through-passage (28) in the shaft module (7) to the tailwater (6),
wherein a horizontal first cross-sectional area of the shaft module (7) is much larger than a vertical second cross-sectional area taken up by the turbine runner (19).

In an embodiment, a shaft power plant (1) for generating electricity by energy conversion of a discharge between a headwater (2) and a tailwater (6), comprises a vertical shaft (7), the top (10) of which forms an inflow plane (11) which is parallel to the bed and extends below the water level (3) of the headwater, wherein the shaft (7) is open toward the top and is closed by a base (9) at its bottom end, a unit (15) composed of a turbine (16) and an electrical machine (17), wherein the unit (15) is arranged entirely under water in the shaft (7) and wherein the turbine (16) is arranged for water to pass through horizontally, and an outflow (24), which is connected to the turbine (16), represents a closed flow channel and leads through a through-passage (28) in the shaft (7) to the tailwater (6), wherein a horizontal first cross-sectional area of the shaft (7) is much larger than a vertical second cross-sectional area taken up by the turbine runner (19).

The invention claimed is:

1. A shaft power plant for generating electricity by energy conversion of a discharge between a headwater and a tailwater, comprising:
   a vertical shaft, the top of which forms an inflow plane which is parallel to a bed and extends below a water level of the headwater, wherein the shaft is open toward the top and is closed by a base at its bottom end,
   a unit having a turbine and an electrical machine, wherein the unit is arranged entirely under water in the shaft and wherein the turbine is arranged for water to pass through horizontally,
   an outflow, which is connected to the turbine, that represents a closed flow channel and leads through a through-passage in the shaft to the tailwater, and
   a damming structure between the headwater and the tailwater,
   wherein a horizontal first cross-sectional area of the shaft is much larger than a vertical second cross-sectional area taken up by the turbine runner,
   further wherein at least one flap that is permanently overflowed is arranged in the damming structure or on a side wall of the vertical shaft.

2. The shaft power plant of claim 1, wherein the first cross-sectional area is at least 1.5 times, in particular 5 times, in particular 10 times, in particular 30 times larger than the second cross-sectional area.

3. The shaft power plant of claim 1, wherein the first cross-sectional area is defined at a level of a turbine axis or at a level of the shaft top.

4. The shaft power plant of claim 1, wherein the shaft top is arranged in a bottom half, in particular in a bottom third, of a water depth of the headwater.

5. The shaft power plant of claim 1, wherein the side wall extends vertically, so that the first cross-sectional area is constant over an entire shaft depth.

6. The shaft power plant of claim 1, wherein a turbine axis of the turbine runner and an armature axis of the electrical machine are arranged coaxially with one another and horizontally.

7. The shaft power plant of claim 1, wherein the shaft is configured with a polygonal or semicircular cross section, further wherein one longitudinal side of the shaft butts directly against the damming structure.

8. The shaft power plant of claim 1, wherein the flap is configured to enlarge an overflow and to open an underflow.

9. The shaft power plant of claim 8, wherein an integrated closure for regulating the underflow is arranged on a bottom edge of the flap.

10. The shaft power plant of claim 1, wherein the base of the shaft is arranged below a bed plane of the headwater.

11. The shaft power plant of claim 1, wherein the outflow comprises, in the following order downstream of the turbine, a flaring cone and at least one of a suction pipe and a suction hose.

12. The shaft power plant of claim 1, wherein the unit is mounted directly on a side wall of the shaft and the outflow extends through the side wall to the tailwater.

13. The shaft power plant of claim 1, wherein the outflow is arranged to a side of the turbine runner, so that during electricity generation the water flows horizontally through the turbine runner.

14. The shaft power plant of claim 1, wherein an inflow into the shaft is provided with a horizontal screen plane.

15. The shaft power plant of claim 10, wherein a flushing channel, which is located lower than the shaft top and lower than the bed plane of the headwater, extends around the shaft, wherein the flushing channel leads to the flap and a bottom edge of the flap is arranged at a level of the flushing channel.

16. The shaft power plant of claim 1, wherein the base of the shaft is arranged above a bed plane of the headwater.

17. The shaft power plant of claim 16, wherein the outflow comprises a cylindrical throughflow of constant cross section through the damming structure.

18. The shaft power plant of claim 1, wherein a bottom edge of the flap is arranged at a level of the shaft top, in particular at a level of a screen plane.

19. The shaft power plant of claim 1, wherein the flap, as seen in a viewing direction from the headwater to the tailwater, is arranged directly downstream of the vertical shaft.

20. A shaft power plant module for generating electricity by energy conversion of a discharge between a headwater and a tailwater, comprising:
   a vertical shaft module having a shaft top that forms an inflow plane which is parallel to a bed and is configured to extend below a water level of the headwater, wherein the shaft module is open toward the top and is closed by a base at its bottom end,
   a unit module having a turbine and an electrical machine, wherein the unit module is configured to be arranged entirely under water in the shaft module and wherein the turbine is configured to be arranged for water to pass through horizontally, and
   an outflow module, which is connected to the turbine, that represents a closed flow channel and is configured to lead through a through-passage in the shaft module to the tailwater,
   wherein the shaft power plant module is configured to be attached to a damming structure between the headwater and the tailwater,
   further wherein a horizontal first cross-sectional area of the shaft module is much larger than a vertical second cross-sectional area taken up by the turbine runner, and
   further wherein at least one flap that is permanently overflowed is arranged in the damming structure or on a side wall of the vertical shaft.

* * * * *